Figure 1:
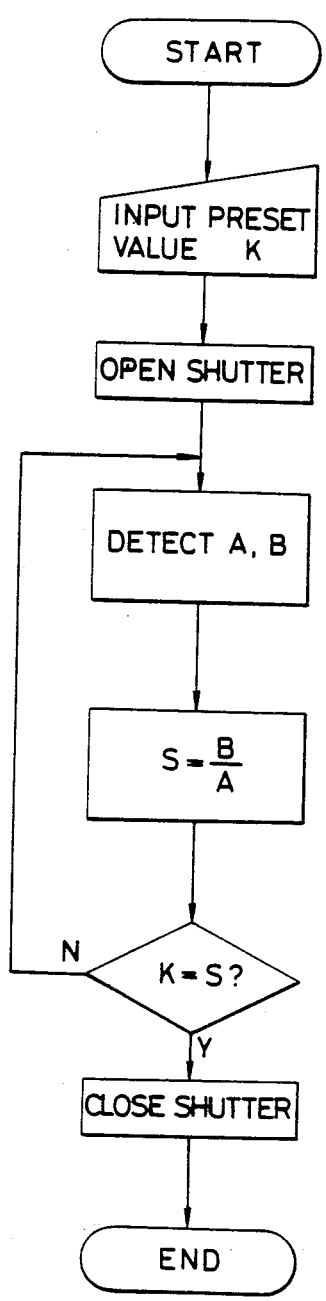
Figure 5:
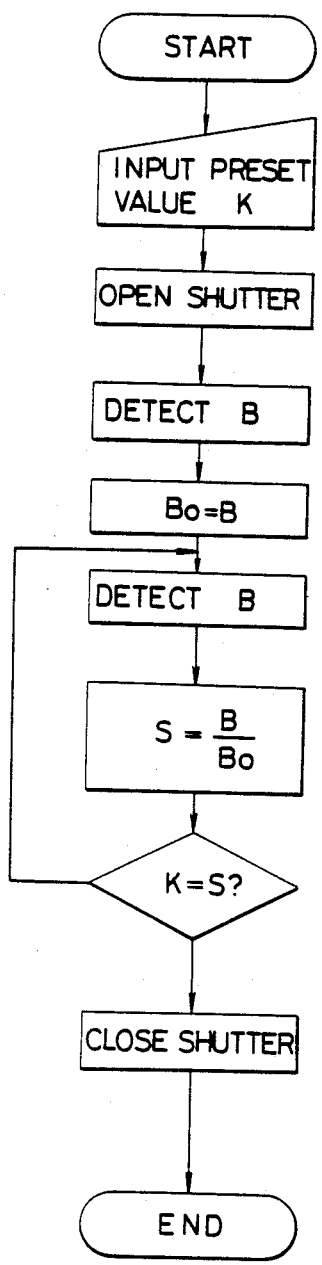
Figure 2:
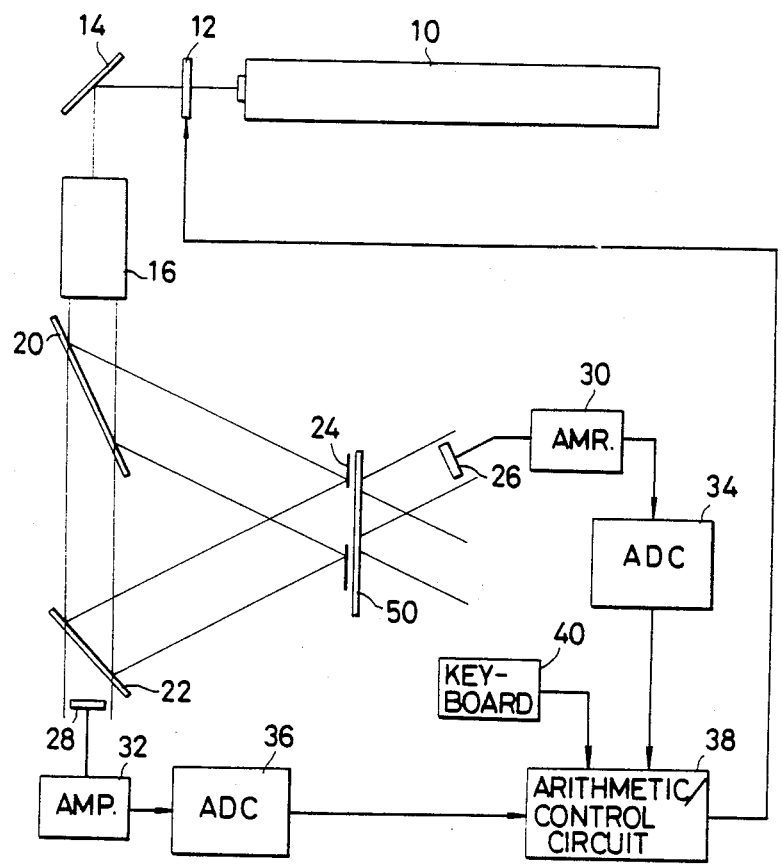
Figure 3:
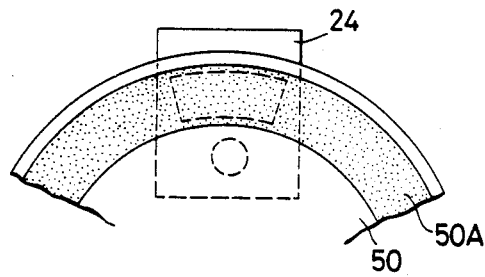
Figure 4:
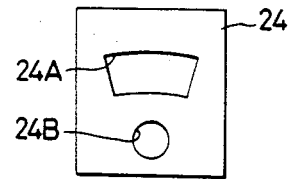

United States Patent [19]

Baba

[11] Patent Number: 4,738,498
[45] Date of Patent: Apr. 19, 1988

[54] METHOD OF RECORDNG A HOLOGRAM

[75] Inventor: Nobuyuki Baba, Kanagawa, Japan

[73] Assignee: Ricoh Company, Ltd., Tokyo, Japan

[21] Appl. No.: 860,131

[22] Filed: May 6, 1986

[30] Foreign Application Priority Data

May 9, 1985 [JP] Japan ............................... 60-98767

[51] Int. Cl.$^4$ ............................................. G03H 1/04
[52] U.S. Cl. ................................. 350/3.6; 350/3.63; 350/320
[58] Field of Search ........................ 350/3.6, 3.61, 3.63, 350/3.71, 3.75, 3.81, 3.82, 320; 365/119; 356/51, 355

[56] References Cited

U.S. PATENT DOCUMENTS 4,252,400  2/1981  Bernal et al. ........................ 350/3.63

*Primary Examiner*—Bruce Y. Arnold
*Assistant Examiner*—Martin Lerner
*Attorney, Agent, or Firm*—Cooper & Dunham

[57] ABSTRACT

A method of recording a hologram on a recording medium composed of a substrate and a recording material coated as a thin layer on the substrate, the recording medium being transparent or semitransparent with respect to light to which the recording medium is exposed. A value B, B/A, B/Bo, A/B, or Bo/B is established where A is the intensity of the light at a surface of the recording medium, B is the intensity of the light that has passed through the recording medium, and Bo is the intensity of the light that has passed through the recording medium immediately after the recording medium has started to be exposed to the light. The recording medium is exposed to the light until the established value is equalized to a preset value. The exposure of the recording medium is stopped when the established value is equalized to the preset value.

4 Claims, 2 Drawing Sheets

METHOD OF RECORDNG A HOLOGRAM

BACKGROUND OF THE INVENTION

The present invention relates to a method of recording a hologram.

Holograms are recently finding more use as optical elements such as hologram lenses, hologram scanners and the like in various optical devices. As optical elements, holograms are required to be optically equivalent to each other. As regards hologram disks used in hologram scanners, they must be optically equivalent to each other for compatibility, and holograms on one hologram disk must also be optically equivalent to each other.

Holograms have heretofore been recorded or photographed under fixed exposure conditions.

Holograms are recorded on a recording medium comprising a recording material coated as a thin layer on a substrate of glass or plastics. In order to be optically equivalent, holograms are made on the same recording material. However, the properties of the recording material used vary slightly as the environment changes from time to time. The manner in which the recording material is processed by exposure to light varies dependent on the condition in which the recording material has been coated, the surface condition of the substrate, the thickness of the recording material layer, and other factors. If the exposure conditions should be fixed, the diffraction efficiencies of the recorded holograms would tend to be different due to recording material irregularities such as changes in the material properties, irregular thicknesses of the coated layer, and the like.

SUMMARY OF THE INVENTION

Accordingly, it is an object of the present invention to provide a method capable of recording optically equivalent holograms irrespective of possible recording material irregularities such as different material properties.

A recording medium on which holograms are to be recorded or photographed comprises a substrate and a recording material coated as a thin layer on the substrate. The recording medium as a whole must be transparent or semitransparent with respect to light to which it is exposed.

It is assumed that the intensity of light to which the recording medium is exposed is expressed as A at the surface of the recording medium, the intensity of such exposure light after it has passed through the recording medium is expressed as B, and the intensity of the exposure light that has passed through the recording medium immediately after the exposure of the recording medium has started is expressed as Bo. The recording medium is exposed to the exposure light until the value of B, B/A or A/B, or B/Bo or Bo/B becomes equal to a preset value. Upon coincidence of these values, the exposure of the recording medium is stopped.

Although the recording material layer is transparent with respect to the exposure light, the transmittance of the recording material layer varies as the photochemical reaction of the recording material due to exposure to light progresses. Generally, the transmittance is progressively increased as the photochemical reaction proceeds. For holograms with the same light interference information recorded to be optically equivalent to one another, their diffraction efficiencies must be the same. Since the diffraction efficiencies vary with the extent to which the photochemical reaction progresses, the diffraction efficiencies can be equalized by uniformizing the extent to which the photochemical reaction progresses at the time of completion of the exposure to light. With the diffraction efficiencies equalized, any number of optically equivalent holograms can be produced. Inasmuch as the extent to which the photochemical reaction progresses can be known from the change in the transmittance of the recording material layer, the extent to which the photochemical reaction progresses is detected by monitoring the change in this transmittance. The exposure of the recording medium to light is finished when the extent of the photochemical reaction reaches a certain level.

There are three ways of monitoring the change in the transmittance. The first process is to know the intensity B of light that has passed through the recording medium. This process is simplest, but useless when the exposure light itself varies, e.g., when the intensity of light emission from a laser beam source varies. If there is a change in the thickness of the recording material layer, the intensity of light that has passed through the recording material layer is caused to vary due to such a thickness change, and such a variation in the light intensity is interpreted as resulting from the progress of the photochemical reaction. This means that any slight change in the thickness of the recording material layer may cause an error. Consequently, in order for the first process to be relied upon, the thicknesses of the recording material layer and the substrate should be as uniform as possible, and the laser beam source used should be capable of emitting a stable amount of light.

According to the second process, a ratio between the intensity A of exposure light at the surface of the recording medium and the light intensity B, i.e., B/A or A/B, is used. This second process can automatically remove any influence of a change in the intensity of the exposure light. However, it cannot eliminate an error caused by a different thickness of the recording material layer. Therefore, the thickness of the recording material layer should be as uniform and constant as possible.

The third process employs a ratio between the light intensity B and the intensity Bo of exposure light that has passed through the recording medium immediately after the recording medium has started being exposed to the light, i.e., B/Bo or Bo/B. This process is capable of automatically removing any influence of a change in the thickness of the recording material layer, but is incapable of removing any influence of a change in the intensity of the exposure light. Since, however, the intensity of the exposure light varies over a period of time which is quite long as compared with the time for which the recording medium is exposed. As a consequence, the exposure light can be regarded as constant in intensity within the exposure time, and any influence due to a change in the intensity of the exposure light is negligible.

Because any influence of a change in the thickness of the recording material layer is also small, substantially optically equivalent holograms can be produced by using any one of the above first, second, and third processes. The produced holograms are most optically equivalent when the third process is employed, and are more optically equivalent when the second process is used than when the first process is used. Although slightly complex, use of B/A.Bo or A.Bo/B can prevent $$B = BI \cdot \epsilon \eta$$

The transmittance $\epsilon$ varies as the photochemical reaction of the recording medium progresses, and the transmittance $\eta$ may be regarded as a constant with respect to the varying transmittance $\epsilon$. Therefore, the transmittance $\eta$ is applied to the arithmetic/control circuit 38, $B/\eta = \beta$ is used instead of B, and $\beta$, $A/\beta$, or $\beta o/\beta$ ($\beta o = Bo/\eta$) may be employed as a value to be compared with the preset value K.

In order to prevent light reflected by the back of the substrate from being recorded as noise, a reflection preventing film is sometimes coated as a strip on the back of the substrate in covering relation to the zone where holograms are to be recorded. This reflection preventing film may block light that would otherwise be applied to the light detector 26. To avoid this, light that has passed through the recording medium may be transmitted through the hole 24B (located out of the region in which the reflection preventing film is formed) of the mask 24, and detected by the light detector 26 for the detection of the light intensity A.

Although certain preferred embodiments have been shown and described, it should be understood that many changes and modifications may be made therein without departing from the scope of the appended claims.

What is claimed is:

1. A method of recording a hologram on a recording medium comprising a substrate and a recording material coated as a thin layer on the substrate, the recording medium being transparent or semitransparent with respect to light to which the recording medium is exposed, said method comprising the steps of:

detecting the intensity A of the light at a surface of the recording medium and the intensity B of the light that has passed through the recording medium while the recording medium is being exposed to the light;
   converting said intensities A, B to digital signals;
   computing a value B/A from said digital signals;
   comparing said computed value with a preset value K;
   exposing the recording medium to the light until B/A = K; and
   stopping the exposure of the recording medium when K = B/A.

2. A method of recording a hologram on a recording medium comprising of a substrate and a recording material coated as a thin layer on the substrate, the recording medium being transparent or semitransparent with respect to light to which the recording medium is exposed, said method comprising the steps of:

detecting the intensity B of the light that has passed through the recording medium and the intensity Bo of the light that has passed through the recording medium immediately after the recording medium has started to be exposed to the light while the recording medium is being exposed to the light;
   converting said intensities B, Bo to digital signals;
   computing a value B/Bo from said digital signals;
   comparing said computed value with a preset value K;
   exposing the recording medium to the light until B/Bo = K; and
   stopping the exposure of the recording medium when K = B/Bo.

3. A method of recording a hologram on a recording medium comprising of a substrate and a recording material coated as a thin layer on the substrate, the recording medium being transparent or semitransparent with respect to light to which the recording medium is exposed, said method comprising the steps of:

establishing a value B/ABo or ABo/B where A is the intensity of the light at a surface of the recording medium, B is the intensity of the light that has passed through the recording medium, and Bo is the intensity of the light that has passed through the recording medium immediately after the recording medium has started to be exposed to the light;
   exposing the recording medium to the light until said established value is equalized to a preset value; and
   stopping the exposure of the recording medium when said established value is equalized to said preset value.

4. A method of recording a hologram on a recording medium comprising a substrate and a recording material coated as a thin layer on the substrate, the recording medium being transparent or semitransparent with respect to light to which the recording medium is exposed, said method comprising the steps of:

establishing a value $\beta$, A/B, or $Bo/\eta\beta$ where A is the intensity of the light at a surface of the recording medium, B is the intensity of the light that has passed through the recording medium, Bo is the intensity of the light that has passed through the recording medium immediately after the recording medium has started to be exposed to the light, $\eta$ is the transmittance of the substrate, and $\beta = B/\eta$;
   exposing the recording medium to the light until said established value is equalized to a preset value; and
   stopping the exposure of the recording medium when said established value is equalized to said preset value.

* * * * *